United States Patent [19]
Williams et al.

[11] Patent Number: 5,262,692
[45] Date of Patent: Nov. 16, 1993

[54] VARIABLE VOLTAGE SWITCHED CURRENT CONTROL

[75] Inventors: Ronald D. Williams; F. Joseph Keith, both of Charlottesville, Va.

[73] Assignee: Center for Innovative Technology, Herndon, Va.

[21] Appl. No.: 867,834

[22] Filed: Apr. 13, 1992

[51] Int. Cl.⁵ .......................... H02K 7/09; G05F 1/08
[52] U.S. Cl. ...................................... 310/90.5; 318/293
[58] Field of Search ............... 318/293, 616, 150, 161, 318/287; 310/90.5, 74

[56] References Cited

U.S. PATENT DOCUMENTS

| | | | |
|---|---|---|---|
| 3,698,775 | 10/1972 | Gilbert | 310/90.5 |
| 4,612,994 | 9/1986 | Kawamura | 318/15 |
| 4,623,202 | 11/1986 | Shingu | 310/90.5 |
| 4,763,032 | 8/1988 | Bramm et al. | 310/90.5 |
| 4,841,184 | 6/1989 | Chen et al. | 318/616 |
| 5,066,879 | 11/1991 | Yamamura | 310/90.5 |

Primary Examiner—William M. Shoop, Jr.
Assistant Examiner—John W. Cabeca
Attorney, Agent, or Firm—Whitham & Marhoefer

[57] ABSTRACT

Provision of a digital controller in which the controller controls the bearing coil current by means of a switching bridge that periodically reverses the applied voltage to the coil. The controller selects an applied voltage from a plurality of discrete voltage sources. When a rapid change in the load current is required, a relatively large magnitude of applied voltage is used. When a relatively constant magnitude of average load current is required, a relatively smaller value of voltage is applied.

1 Claim, 3 Drawing Sheets

VARIABLE VOLTAGE SWITCHED CURRENT CONTROL

BACKGROUND OF THE INVENTION

1. Field of the Invention

This invention relates to an improvement in switched current control systems for inductive loads, more particularly, a system for controlling the current in a magnetic bearing.

2. Description of the Prior Art

FIG. 1 illustrates a typical magnetic bearing support system. This configuration has two radial bearings and a single thrust bearing to apply force to the shaft in "x", "y" and "z" axis directions. Magnetic bearings are inherently unstable in open-loop operation, and thus require some type of feedback control to regulate the bearing forces and stabilize the system. The controller relates rotor position to bearing coil current: position measurement is accomplished by shaft displacement sensors located along each control axis. The controller output develops the required current in the bearing coils.

Adaptive, open-loop and multi-axis state space control schemes are examples of techniques which require the flexibility and computational capability of a digital computer for successful implementation. For example, one type of adaptive control automatically adjusts feedback coefficients as the rotor speed is varied. This modifies the dynamic characteristics of the rotor system and adjusts the rotor's critical operating speeds to prevent the system from operating near (or passing through) critical speeds during rotor run-up or steady state operation. MIMO (multiple-input, multiple-output) statespace algorithms which incorporate models of the rotor can also provide significant advantages over simpler control schemes. Such algorithms estimate rotor behavior at locations along the rotor not directly measured by sensors or directly acted upon by a bearing. This information can then be used to exercise control over a section of the rotor not easily accessed by a sensor or a magnetic actuator.

Explicit control of bearing current is accomplished through a power amplifier that drives a current through a load. This current is proportional, over the amplifier bandwidth, to a control signal that is typically a voltage. Since the impedance of a magnetic bearing coil is generally a strong function of the operating conditions, and the output stage of a power amplifier typically applies a voltage to the attached load rather than a current, high-gain current feedback is required to achieve the required true transconductance behavior. In addition, amplifiers used in magnetic bearing applications must possess sufficient voltage overhead to provide adequate current slewing in the typically highly inductive bearing coils, in order to provide bearing force slewing capability. As a result, the required supply voltage will typically be well in excess of the voltage needed merely to provide the coil bias current.

Switching power amplifiers are advantageous for magnetic bearing application because they lower power dissipation by only operating the output transistors in a saturated "on" (low resistance) state or an "off" (very high resistance) state. Power dissipation occurs in these amplifiers primarily while the transistors are switching from one state to the other, with some power also being dissipated in the on state due to the non-zero on-resistance of the transistors. Because most of the power dissipation in these amplifiers occurs during the state transitions, the efficiency relies on keeping the switching rate below some threshold which depends upon the switching characteristics of the output transistors. By switching the output stage at rates in excess of the required amplifier bandwidth (typical switching rates are 10–100 KhZ) and varying the duty cycle of the output waveform, it is possible to create an output signal which combines the desired low frequency component with a higher frequency noise component. A central design issue for a switching transconductance amplifier involves reconciling the requirements of load insensitivity, explicit control of coil current, and efficiency in order to achieve robust, high bandwidth, low distortion operation. Detailed discussion of these issues are presented in ¢Switching Amplifier Design for Magnetic Bearings," by F. J. Keith et al., *Proceedings of the 2nd International Symposium on Magnetic Bearings*, Jul. 12-14, 1990, Tokyo, Japan, pp. 211-218.

It is known to include multiple switching components in a switching power amplifier so that the switches effectively reverse the polarity of the control voltage applied to the bearing or other highly inductive load, rather than attempting to throttle the current through the bearing. This arrangement permits current to continue to flow against a strong back electromotive force. This H-Bridge configuration is illustrated in FIG. 2.

In this known configuration, a controller periodically closes both switches in switch pair A while both switches in switch pair B are open, and periodically opens both switches in switch pair A and closes both switches in switch pair B. Varying the periods during which pair A is closed relative to the period during which pair B is closed varies the current through the bearing. The switches are equivalent to resistances that have near zero value when closed and near infinite value when open.

Maintenance of a constant average current in the load using periodic switching of the voltage polarity yields a ripple current in the load in addition to the constant average current as illustrated in FIG. 3. It is often desirable to limit the magnitude of this ripple component. The change in the current as a function of time increases with increased applied voltage. If the circuit resistance and load inductance cannot be changed, then this ripple component can be reduced by either decreasing the applied voltage magnitude or by increasing the switching rate.

Increases in the switching rate are typically limited by the characteristics of the physical switches. The physical switches used are typically solid state devices that exhibit finite transition times between the on and off states. During these finite transition times, the devices present equivalent resistance values that are intermediate to the on and off equivalent resistances. Heat is produced during these transition intervals when current passes through the devices as they offer intermediate resistance to the current flow. This characteristic along with other switching speed limitations of the physical devices constrain the upper limit of switching rate.

For magnetic bearing actuators, the average current desired can change frequently and rapidly. Operation of the magnetic bearing actuator may require that the average current through the actuator remain essentially constant for a relatively long period of time, or very rapid changes in the actuator current may be required. Rapid changes in the current in an inductive load require significant voltage "headroom". Unfortunately, this high voltage magnitude required for rapid changes also increases the current ripple during the intervals when the desired average current is relatively constant.

SUMMARY OF THE INVENTION

A further object of the invention is the provision of a switched, current controller that rapid changes the bearing coil current, while providing low ripple operation.

Briefly, this invention contemplates the provision of a digital controller in which the controller controls the bearing coil current by means of a switching bridge that periodically reverses the applied voltage to the coil. The controller selects an applied voltage from a plurality of discrete voltage sources. When a rapid change in the load current is required, a relatively large magnitude of applied voltage is used. When a relatively constant magnitude of average load current is required, a relatively smaller value of average load current is used.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 4:
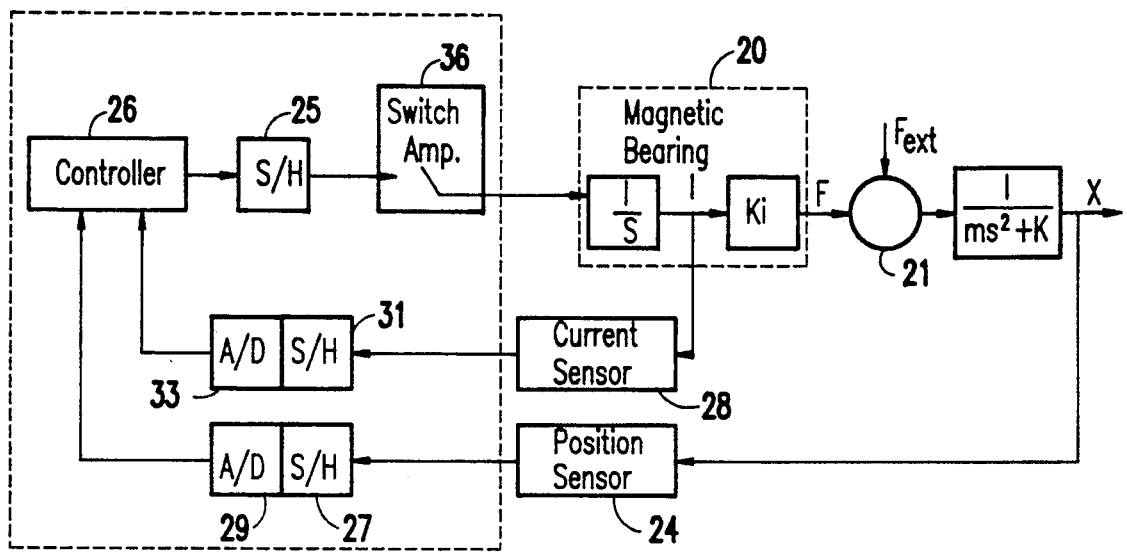
FIG. 4 is a control loop of magnetic bearing current control system in accordance with the teachings of this invention.

Referring now to the drawings, FIG. 4 is a control-loop diagram of a digital control system controlling the current in a magnetic bearing 20 that exerts a force F upon a rotating shaft 21 that is also subjected to external forces $F_{EXT}$. As will be appreciated by those skilled in the art, sum of these forces determine a shaft position "x" that is detected by a position sensor 24 whose output voltage is coupled to a digital controller 26 via a sample and hold circuit 27 and an analogue to digital converter 29. Similarly, a current sensor 28 senses the magnetic bearing current (I), and generates an output voltage signal proportional to the magnitude of the current. Sample and hold circuit 31 and analogue to digital converter 33 couple the output of sensor 28 to the controller 26.

The digital controller 26 may comprise any suitably programmed high-speed digital processor, such as, for example, the Texas Instruments Corporation TMS320C30 processor. The digital controller, under program control, compares the position and current inputs with reference values. These reference values may be determined externally and inputted to the database of the controller and may also be generated, in operation, by the controller under program control.

A sample and hold circuit 25 couples an output port of controller 26 to a switching power amplifier 36. Switching amplifier 36 controls the current in the magnetic bearing by periodically reversing the applied voltage to the bearing coil.

Figure 1:
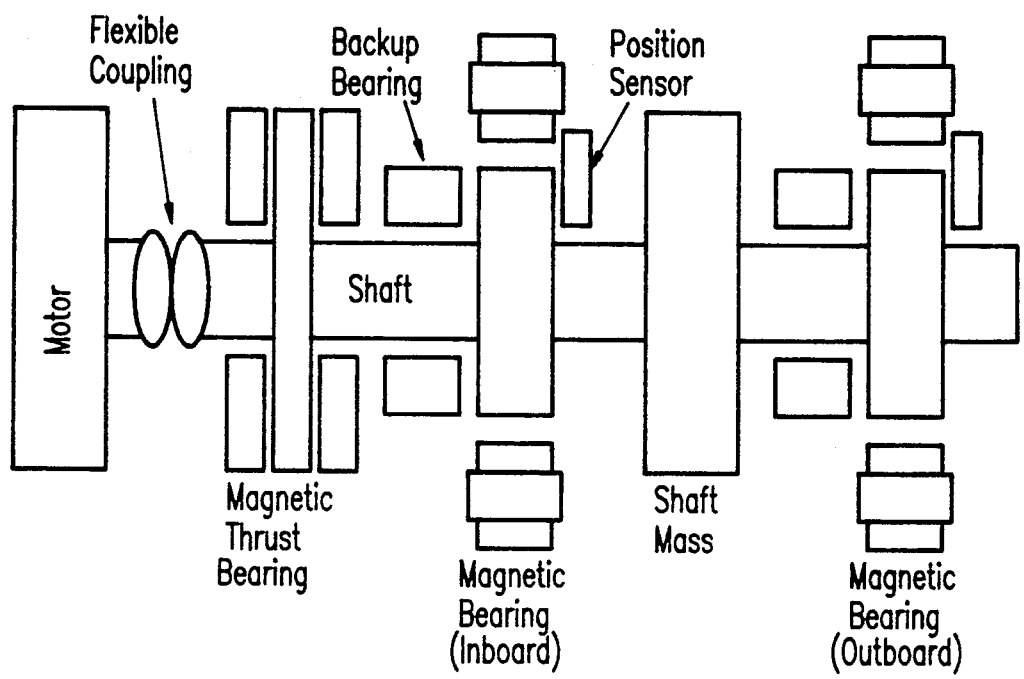
FIG. 1 is a schematic representation of a typical magnetic bearing system.
Figure 2:
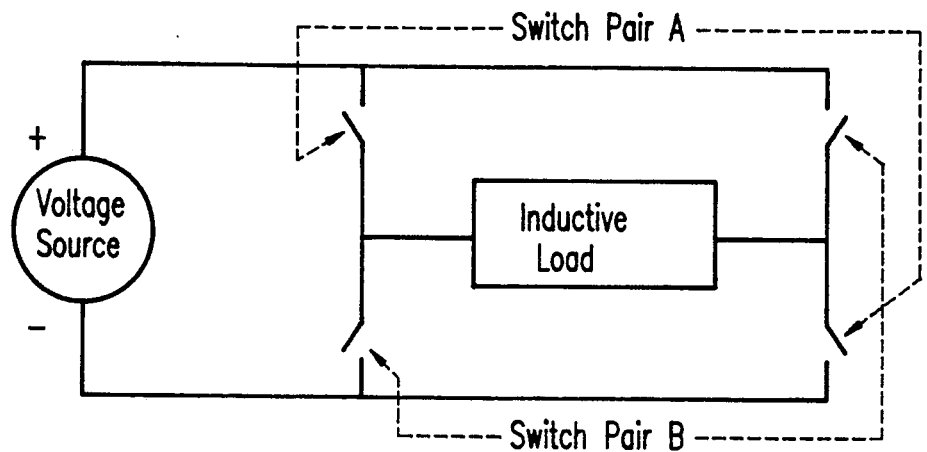
FIG. 2 is a block diagram of a typical prior art switching amplifier.
Figure 3:
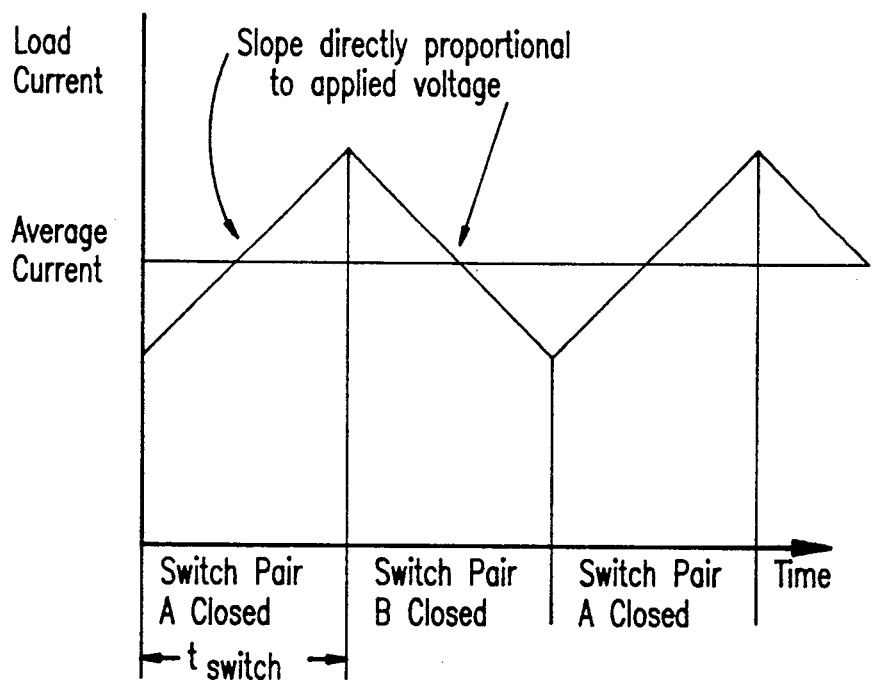
FIG. 3 is an idealized plot of typical load current waveform using a switching amplifier of the type illustrated in FIG. 2.
Figure 5:
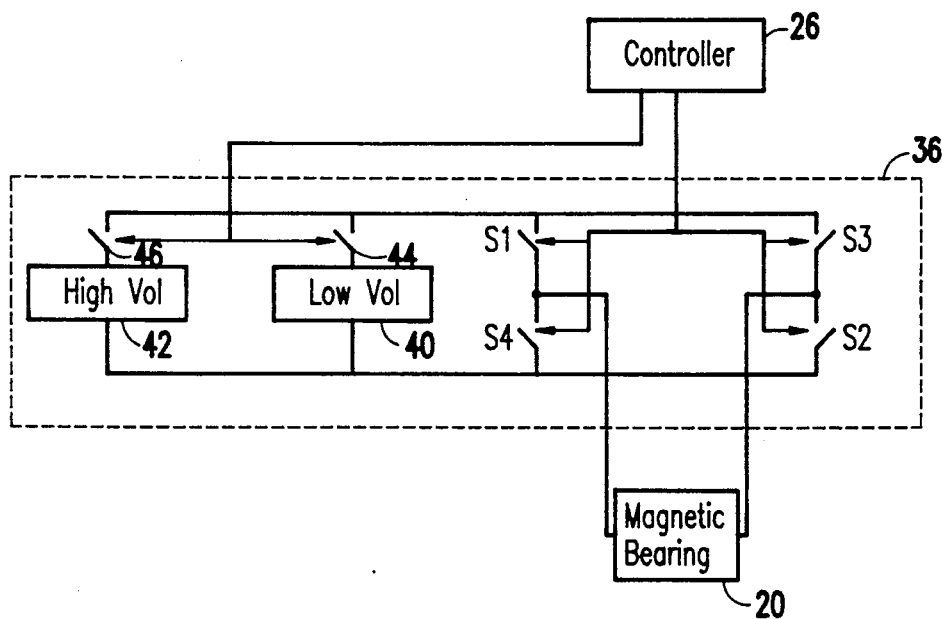
FIG. 5 is a schematic block diagram of one embodiment of a switching amplifier in accordance with the teachings of this invention.

Referring now to FIG. 5 in addition to FIG. 4, to vary the coil current, the controller 26 controls the operation of switching amplifier 36 to vary the relative duration of the period of forward applied voltage to the duration of the period of applied voltage in a reverse direction to oppose the current flow. Here it will be noted that the single voltage source of the bridge controller shown in FIG. 2 has been replaced by two discrete voltage sources; a relatively low voltage source 40 and a relatively high voltage source 42. While this specific embodiment of the invention uses two discrete, switchable voltage sources, it will be appreciated that more than two sources may be used, if desired, for a particular application. A switch 44 controlled by controller 26 connects and disconnects, on command, the low voltage source 40 to the bearing coil. Similarly, a switch 46, whose operation is also controlled by the controller 26, connects and disconnects, on command, the high voltage source 42 to the bearing coil.

Controller 26 controls the relative periods of forward and reverse voltage coupled to the coil via bridge via switches S1-S4. If the magnitude of change is below a predetermined limit, the controller 26 connects the low voltage source 40 to the switching amplifier (S1-S4) by closing switch 44. If the magnitude of change is above a predetermined limit, the controller connects the high voltage source 42 to the switching amplifier by closing switch 46. Here it should be noted that preferably one of the switches 44 or 46 is closed at all times so that voltage is continuously coupled to the switching amplifier during operation of the system.

A practical embodiment of this configuration would use solid state devices to accomplish the function of the various switches. Capacitive energy storage devices would be included in the circuit as necessary to stabilize the presented voltage. While a plurality of discrete voltages could be used, the initial implementation uses only a higher voltage to provide rapid load current change and a lower voltage to limit the load current ripple when a relatively constant load current is desired.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for controlling current in a magnetic bearing coil, comprising the steps of:
   comparing the magnitude of said current to a reference in order to generate a control signal proportional to the magnitude of the difference between said current and said reference;
   coupling across said magnetic bearing coil a voltage of a forward polarity for a first period and of a reverse polarity for a second period in order to regulate the current flow through said magnetic bearing coil;
   varying said first period relative to said second period in response to said control signal; and
   selecting one of two selectable voltages and coupling said selected voltage to said magnetic bearing coil, said selection step selecting a relatively high potential when said control signal exceeds a predetermined threshold value and selecting a relatively low potential when said control signal is less than said predetermined threshold value.

* * * * *